May 13, 1930.  L. F. FISHER  1,758,658

HEATER

Filed June 15, 1928

Inventor:
Lee Forrest Fisher,
By Hugh K. Wagner
Attorney.

Patented May 13, 1930

1,758,658

UNITED STATES PATENT OFFICE

LEE FORREST FISHER, OF ST. LOUIS, MISSOURI

HEATER

Application filed June 15, 1928. Serial No. 285,689.

Figure 1:
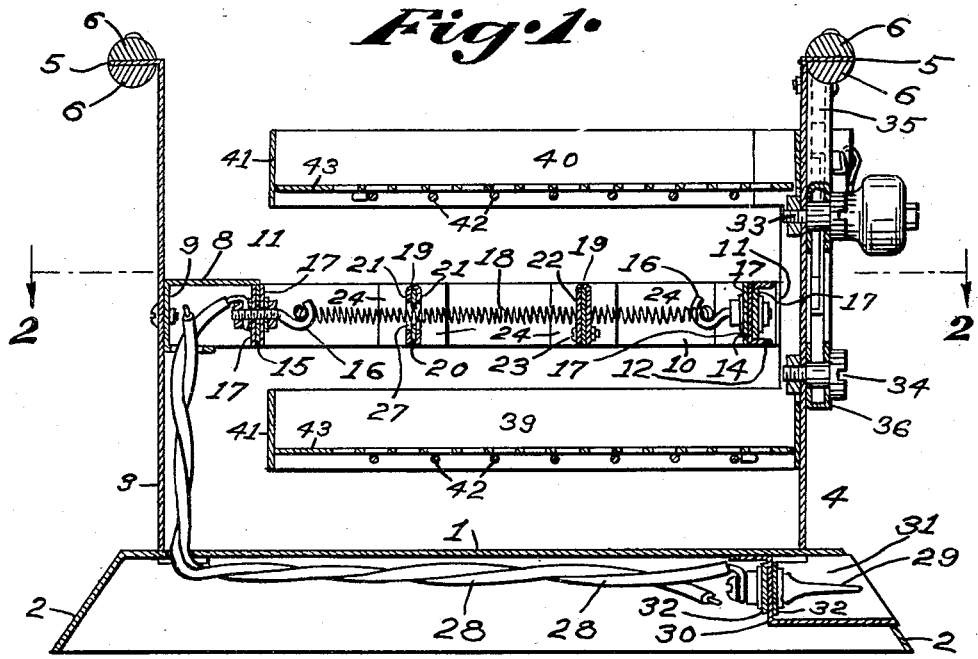
Figure 2:
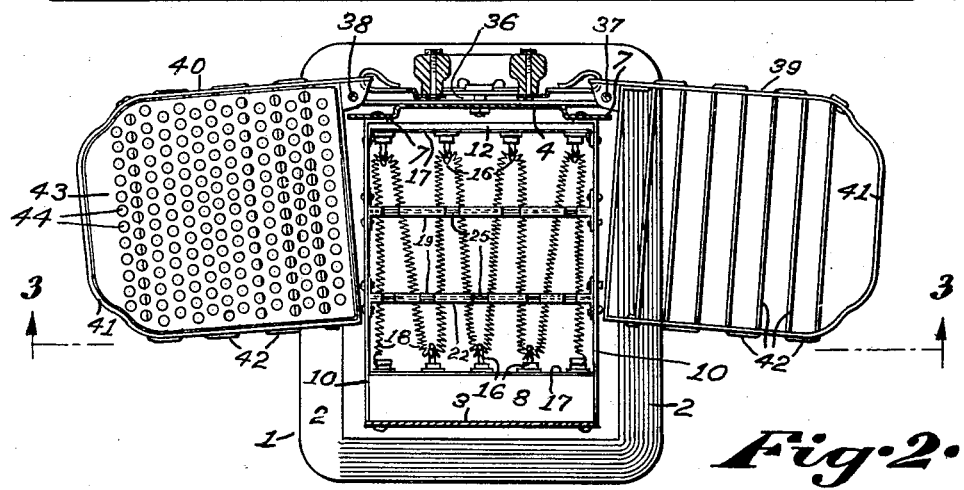
Figure 3:
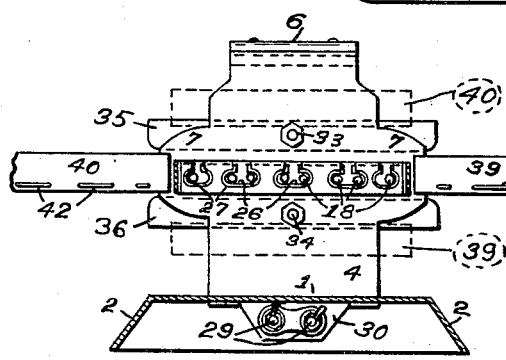

This invention relates to heaters, and has more particular reference to a heater having a source of heat and means for holding an article in spaced relation to said source so that the article is heated by said source. The present invention contemplates the provision of means for varying the degree of heat imparted to the article in a given time without altering the heat at the source or without varying the distance between the source and the article. The invention is also applicable to a heater having article holding devices disposed respectively on opposite sides of a source of heat in spaced relation thereto, and also aims to provide means for optionally diverting from one article to the other a portion of the heat that would otherwise normally have been transmitted from said source to said one article, and to do this without altering the heat at the source or without varying the distances of said articles from said source. Other objects and desirable features of the invention will appear in the course of the following description.
While the invention is applicable to heaters of the above-mentioned type generally, for illustrative purposes it has been disclosed herein as being embodied in a toaster disclosed and claimed in another application filed simultaneously herewith by the same inventor. Only so much of the toaster, however, as is necessary to show the connection of the invention of this application therewith, is shown herein.
In the accompanying drawings forming part of this specification, in which like numbers of reference denote like parts wherever they occur, Figure 1 is a vertical longitudinal central sectional view of the toaster embodying this invention, showing the holders in position over and under the source of heat;

Figure 2 is a plan view partly in section on the line 2—2 in Figure 1, but showing the holders extended away from the heating means; and Figure 3 is a fragmentary vertical sectional view taken on the line 3—3 in Figure 2.

The supporting frame of the toaster is preferably formed of sheet metal and comprises a substantially rectangular base 1 having a downturned marginal flange 2, and uprights 3 and 4 secured to the base adjacent to and along the anterior and posterior lateral edges thereof, respectively. The upper ends of the uprights are bent outwardly to form flanges 5 that have secured thereto on opposite sides thereof complemental semi-cylindrical handle portions 6, preferably formed of insulating material and by means of which the toaster may be conveniently lifted and carried about. Ears 7, project laterally from the intermediate portions of the lateral edges of the posterior upright 4 and are offset into a plane disposed slightly forward of the plane of the upright 4. A channel-shaped bracket 8 is horizontally disposed along and has one of its depending flanges 9 secured to the intermediate portion of the inner side of the anterior upright 3. Side bars 10 connect the flange 9 to respective ears 7, being preferably provided with ears 11 that are suitably bolted thereto. A transverse channel bar 12 is provided with ears 13 at its opposite ends through which it is bolted to the side bars 10 immediately behind the ears 7. The web 14 of bar 12 and the flange 15 of channel bar 8 are provided with openings for the reception of suitable bolts 16 and adapted to be clamped thereto and to be insulated therefrom by suitable strips or plates 17 of dielectric material, preferably mica, clamped thereon by said bolts on opposite sides of said web 14 and flange 15. The bolts 16 borne by the web 14 and the intermediate bolts 16 borne by the flange 15 present inwardly projecting ends of hook formation adapted to sustain the bends of a coiled heating element or resistance wire 18, wound back and forth thereon and having its ends secured to the outer hookless or terminal bolts 16 of the flange 15. A pair of intermediate transverse bars 19 assist in supporting the strands of the element 18 and in spacing them a suitable distance apart.

The bars 19 each comprise a dielectric strip 20, preferably mica, securely held between the opposing flanges 21 of the sheet metal channel beam 22, preferably by bolts

23. The flanges 21 are provided at their ends with ears 24 that are bolted to the side beams 10. The bars 19 are provided with slots or notches 25 in their upper edges to receive the strands of the element 18. The marginal edge 26 each of the slots 25 in the dielectric strip 20 is projected inwardly with respect to the marginal edge 27 of each of the slots 25 in the metal flanges 21, so as to prevent contact of the element 18 with the flanges 21. The terminal bolts of binding screws 16 of the flange 15 are electrically connected by means of insulated leads 28 to respective prongs 29, borne by the wall 30 of the recess 31 formed in the rear of the base 1, but insulated therefrom by plates 32 of suitable dielectric, preferably mica. The prongs 29 are adapted to fit the recesses of a slide plug of a conventional type that forms one end of a well-known type of flexible cord or electric cable, the other end of which is of plug formation to fit any conventional or usual type of socket outlet of an electrical supply circuit.

A pair of studs 33 and 34 are affixed to the intermediate portion of the rear side of the upright 4 and in vertical alinement with one another. The said studs support a parallel motion mechanism comprising parallel levers 35 and 36, pivoted intermediately of their lengths to the studs 33 and 34 respectively; and parallel links 37 and 38, having their ends pivotally connected to the ends of the levers 35 and 36 so as to form a parallelogram therewith. Links 37 and 38 form vertical pivoted axes for respective toast holders 39 and 40. Each of the holders 39 and 40 comprises a horizontal substantially rectangular sheet metal enclosing lateral wall 41, the opposing side portions of which are provided with a series of openings along the bottom thereof, through which an elongated element or wire 42 passes back and forth across the open bottom to form a support for the toast or the perforated plate to be hereinafter referred to. For the reason to be presently set forth, means is provided that is adapted optionally to be interposed between the heating means 18 and the toast of one holder to divert from said toast to the toast of the other holder a portion of the heat that would otherwise normally have been transmitted to the said first-mentioned toast. In the invention herein described, the said means consists of a metal heat-reflecting plate 43, adapted to be placed in the toast holders 39 and 40 and to be supported on the cross wires 42, and having a plurality of perforations 44 through which a portion of the heat from the heating source 18 is transmitted to the toast thereon, the plate in the upper toast-holder reflecting to the toast in the lower holder another portion of the heat that would otherwise, in the absence of said plate, normally have been transmitted to the toast in the upper holder.

The construction of the heater having been fully described, the manner of using it will be readily understood. Assuming that unbuttered bread is the article to be heated and that the parts of the heater are in the positions shown in Figure 2, and that the plates 43 are removed from the holders, the bread is placed in the holders and the latter are swung to the positions indicated in Figure 1 and in dotted lines in Figure 2. An electrical connection having been effected from a source of electrical energy to the prongs 29, the bottom of the bread in the upper holder 40 and the top side of the bread in the lower holder 39 are toasted in the same time to the desired degree, when the positions of the holders is exchanged so that holder 39 is now over the source of heat 18 and holder 40 is under the same. In this position the remaining sides of the bread will be toasted after which the holders may again be swung outwardly into position for removing the toast therefrom. Should the toaster be employed for making buttered toast, the plates 43 are placed in the holders, and the bread placed on the plates with the buttered side on top and, the proper amount of heat being diverted by the plate 43 in the upper holder from the unbuttered bottom of the toast therein to the buttered top of the toast in the lower holder, the upper buttered side of the bread in the lower holder will be toasted to the same degree in the same time as the unbuttered bottom side of the bread in the upper holder. When one side of each piece of bread has been toasted, the positions of the holders may be exchanged to toast the reverse sides of the bread.

It will be observed that, although the heater has been described as being embodied in a toaster, it may assume other forms and is capable of heating other articles than bread, and, moreover, certain features of the invention are applicable to a heater or toaster having but a single holder, which need not necessarily be shiftable.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a heater, a source of heat, a pair of article-holding devices interchangeably disposed on opposite sides of said source and in spaced relation thereto, and a pair of perforated plates, each being supported by said article-holding devices, the plate in the upper holding device being adapted to reflect to the article in the lower holding device the heat otherwise normally transmitted to the article in the upper holding device.

2. In a heater, a source of heat, a pair of article-holding devices adapted to be interchangeably arranged above and below said source and plates supported by said article-holding devices, said devices being operable whereby the plate in the upper holding device reflects to the article in the lower holding device a portion of heat normally transmitted from said source to the upper holding device.

In testimony whereof I hereunto affix my signature.

LEE FORREST FISHER.